J. M. SPITZGLASS.
GAGE.
APPLICATION FILED JAN. 3, 1916.
1,274,101.
Patented July 30, 1918.
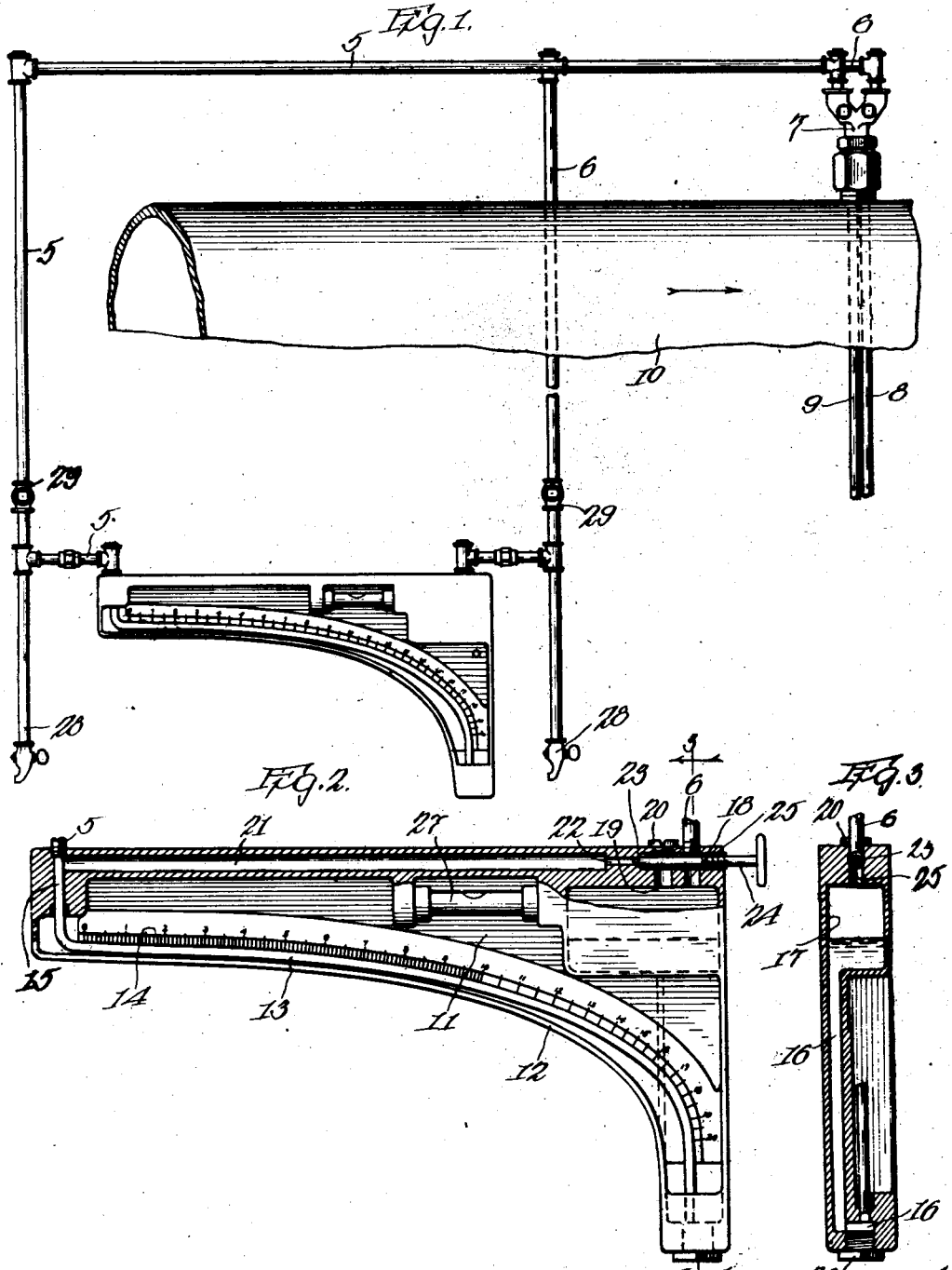
Witness:
Leo J. DuMais.
Inventor
Jacob M. Spitzglass
Brown, Wisewo[illegible]
Attys

UNITED STATES PATENT OFFICE.

JACOB M. SPITZGLASS, OF CHICAGO, ILLINOIS.

GAGE.

1,274,101.  Specification of Letters Patent.  Patented July 30, 1918.

Application filed January 3, 1916. Serial No. 69,770.

*To all whom it may concern:*

Be it known that I, JACOB M. SPITZGLASS, a citizen of the United States, residing at Chicago, in the county of Cook and State of Illinois, have invented certain new and useful Improvements in Gages, of which the following is a specification.

This invention relates to a gage more particularly designated as a square root differential gage for the purpose of measuring or indicating the flow of a fluid in pipes. The principal object of the invention is to provide a new and improved gage of this kind which is particularly adapted for reading the differential pressures from a Pitot tube corresponding to a low velocity of fluid flow in a pipe which would produce only a slight differential pressure. The principal object therefore is to provide an improved scale of this class which is so constructed as to indicate the lower velocities with the same sensitiveness as the higher velocities which the gage is required to register.

The invention consists in the construction, combination and arrangement of the several parts by means of which this result is obtained. Other objects will appear hereinafter.

In the accompanying drawings, Figure 1 is an illustration of a gage of this class connected by means of a Pitot tube to a pipe in which it is desired to measure the velocity of flow; Fig. 2 is a view, partly in section, of the gage proper, and Fig. 3 is a sectional view on the line 3—3 of Fig. 2.

Referring more particularly to the construction, the gage proper is connected by means of pipes 5 and 6 with a Pitot tube, designated generally by the reference numeral 7, which has static and dynamic tubes 8 and 9 disposed in a pipe 10 in which it is desired to measure the velocity and flow.

The gage proper comprises a casting 11 with a lower flanged edge 12 substantially in the form of a parabolic arc which serves as a guard or protector for a gage glass 13 located adjacent thereto and also adjacent the face of the casting which is provided with a graduated scale 14, the graduations referring to the glass. The material part of the gage glass is constructed in the form of a parabolic arc for the reasons hereinafter shown and one end of the glass is sealed in connection with a passage 15 which communicates with one of the tubes 5, while the other end of the glass is sealed in connection with a passage 16 which continues upwardly from the lower level of the gage glass forming communication with a chamber 17 formed in the casting. This chamber 17 has an aperture 18 with which the other pipe 6 has communication and also a filling aperture 19 normally closed by a plug 20 which is adapted to be removed for the purpose of filling the chamber 17 with liquid without disconnecting the pipe 6 from the chamber.

In order to equalize the pressures at the two ends of the gage glass, as for example in first placing the gage in operation, a by-pass 21 is formed in the casing which forms communication between the passages 15 and 18 and 19. At one end this by-pass is restricted as at 22 forming a seat 23 for a needle valve 24 which is threaded through a packing gland 25. By merely opening the needle valve the same pressure is admitted to both ends of the gage glass and there will therefore be no tendency to blow the liquid out of the gage glass.

A plug 26 is provided for convenience in coring out the casting, and projections are also provided for seating a fluid level 27 by aid of which the gage may be adjusted into proper position. The pipes 5 and 6 are each provided with draw faucets 28 by means of which they may be drained of any liquid, as for example, water of condensation, and a check valve 29 is commonly provided in each pipe to prevent the back flow of liquid or a rush of liquid in the wrong direction.

Following are the principles upon which this square root differential gage is constructed: In all cases where a liquid column is employed to indicate the velocity head or pressure difference in the flow of a fluid, the object is to determine the amount of the flow, or the velocity of the fluid equivalent to the pressure difference or velocity head.

From the relation of pressure and velocity, the square of the velocity of a fluid is proportional to the pressure difference or equivalent head; for instance, when the velocity of the fluid is doubled the velocity head increases to 4 times its original value. This relation is represented by the familiar equation $$V^2 = 2gh$$

where V is the velocity of the fluid in feet per second, $g$ is the gravity unit of weight equal to 32.2. and $h$ is the velocity head in feet of the given fluid.

When the velocity is counterbalanced by a liquid column of given density or weight the ratio between the density of the fluid and the density of the liquid is a constant quantity, and since $2g$ is also a constant, the equation becomes, $$V^2 = \text{a constant times } h$$

which represents the familiar equation of the parabolic curve.

Let $U^2 = \dfrac{V^2}{\text{constant}}$; then $U^2 = h$ $U$ and $h$ are taken as the horizontal and vertical coördinates, respectively, of a parabolic curve plotted to represent the equation $U^2 = h$. This curve will pass through the following and similar points:

*Corresponding values—*

| of $U$. | of $h$. |
|---|---|
| .1 | .01 |
| .2 | .04 |
| .3 | .09 |
| .4 | .16 |
| .5 | .25 |
| .6 | .36 |
| .7 | .49 |
| .8 | .64 |
| .9 | .81 |
| 1.0 | 1.00 |

When a glass tube of a differential gage is laid out with a vertical axis in the shape of a parabolic arc which is concave downwardly, the values of $U$ and $h$ are bound to correspond with each other; that is, the vertical drop $h$ is equal to the square of a horizontal displacement $U$, or $h = U^2$, and vice versa, the horizontal displacement $U$ is equal to the square root of the vertical drop or $$U = (h)^{\frac{1}{2}}$$

Thus it is seen the gage glass is curved to such an extent that the vertical drop is increased proportionally with the square of the horizontal distance on the scale of the gage.

The vertical drop is laid out to actual scale. For the horizontal divisions a base of ten inches is used for the first unit. After the first unit the scale is gradually reduced to zero where the tube turns straight downward. In this gage, therefore, the divisions on the scale represent units of velocity or volume of the flow, since each unit is equal to the square root of the corresponding vertical drop or head equivalent to the given velocity.

By bending a glass tube to a parabolic arc shape the sensitiveness of the gage increases as the head decreases. In a one to ten inclined gage the scale distance for the .01 (one one-hundredth) inch head is one-tenth of an inch. But when the glass tube is bent in the parabolic arc shape the scale distance for the first one hundredth of an inch is one inch, or ten times as large as in the one to ten inclined gage.

When the gage and Pitot tubes are set for a given condition the scale can be made to read in cubic feet of fluid directly, by including the necessary factors in the graduation of the scale. It is obvious that this gage is particularly adapted for indicating the flow of fluid in a pipe in the manner above described and it is particularly adapted for the reading of a relatively low velocity of fluid flowing in the pipe.

What I claim is:

1. In a differential pressure gage, a tube having a liquid column therein subjected to differential pressure at its ends and curved downwardly from a vertical axis in the form of a parabolic arc.

2. In a gage of the class described, a member provided with tubular outlets spaced from each other and one at a lower elevation than the other, a well in connection with the lowermost tubular outlet, and a parabolically curved gage glass concave downwardly extending between the outlets, the well being situated to keep the tube full of liquid.

3. In a gage of the class described, a casting formed with tubular outlets spaced from each other and one at a lower elevation, a well formed in the casting and connected with the lower outlet, a bypass in the casting to connect the well with the other outlet, a valve for controlling the bypass, and a parabolically curved tube concave downwardly and extending between the said outlets.

4. In a gage of the class described, a member having spaced tubular openings one disposed below the other and with a well to which the lower opening leads, a gage glass in the form of a parabolic arc concave downwardly with a vertical axis and extending upwardly from one opening to the other and normally kept filled with liquid by the well, means for introducing differential pressure to the ends of the gage glass, and a valved by pass connecting the well and the other end of the gage glass.

5. In a gage of the class described, a member formed with a well and a passage connected thereto, a passage in the member connected with the well by a valved by-pass and a gage glass extending downwardly in a parabolic curve which has a vertical axis and is concave downwardly from the end of said passage to the passage directly connected with the well, and means for introducing differential pressure at the ends of the gage so that with equal pressure at the ends the glass will be substantially full but under differential pressure the liquid will be forced from the upper end of the glass against the head formed by the well.

6. In a gage of the class described, the combination with a gage glass in the form of a parabolic arc having a vertical axis and concave downwardly with its lower end bent sharply downward, means forming a well in connection with the lower end of the glass to maintain the glass full of liquid under equal pressure at the ends thereof, and means for introducing differential pressure at one end of the glass and to the said well.

In testimony whereof I have signed my name to this specification, in the presence of two subscribing witnesses, on this 23d day of December, A. D. 1915.

JACOB M. SPITZGLASS.

Witnesses:
CHARLES H. SEEM,
KENT W. WONNELL.